United States Patent
Baker (10) Patent No.: US 11,131,410 B2
(45) Date of Patent: Sep. 28, 2021

(54) EXTENSIBLE BELLOWS

(71) Applicant: Austin Baker, Las Vegas, NV (US)

(72) Inventor: Austin Baker, Las Vegas, NV (US)

( * ) Notice: Subject to any disclaimer, the term of this patent is extended or adjusted under 35 U.S.C. 154(b) by 0 days.

(21) Appl. No.: 14/249,352

(22) Filed: Apr. 10, 2014

(65) Prior Publication Data

US 2014/0339819 A1    Nov. 20, 2014

Related U.S. Application Data

(60) Provisional application No. 61/811,016, filed on Apr. 11, 2013.

(51) Int. Cl.
*F16L 27/12* (2006.01)
*A47J 37/07* (2006.01)

(52) U.S. Cl.
CPC ............. *F16L 27/12* (2013.01); *A47J 37/079* (2013.01)

(58) Field of Classification Search
CPC ............ F16L 27/12; A47L 9/244; F16B 7/105
USPC ...... 285/302, 7, 298, 303; 403/109.1, 109.2, 403/109.5
See application file for complete search history.

(56) References Cited

U.S. PATENT DOCUMENTS

| | | | | |
|---|---|---|---|---|
| 4,556,240 | A * | 12/1985 | Yoshida | |
| 5,462,311 | A * | 10/1995 | Cipolla | A47L 9/244 285/24 |
| 6,830,227 | B2 * | 12/2004 | Nakatani | 248/354.3 |
| 6,854,916 | B2 * | 2/2005 | Hsieh | 403/109.1 |
| 8,312,572 | B2 * | 11/2012 | Heffner | E03D 9/00 4/255.01 |
| 2004/0078925 | A1 * | 4/2004 | Evans | 15/414 |
| 2005/0146133 | A1 * | 7/2005 | Snyder, Sr. | |
| 2011/0101716 | A1 * | 5/2011 | Nolte | 403/109.2 X |

* cited by examiner

*Primary Examiner* — Zachary T Dragicevich
(74) *Attorney, Agent, or Firm* — Bycer Law, PLC; Matthew L. Bycer; Michael B. Marion (57) ABSTRACT

Extensible mouth bellows for acceleration of flame, as in kindling a campfire, includes four successively nested tubes in longitudinally movable, frictionally retarded movable relation over a limited range between extended and retracted configurations. Shims cooperate with the tubes and with inwardly constricted ends thereof to directionally stabilize the arrangement of tubes and to prevent separation in forward or rearward direction.

13 Claims, 7 Drawing Sheets

EXTENSIBLE BELLOWS

This application claims the benefit of earlier-filed U.S. Provisional Patent Application No. 61/811,016, filed Apr. 11, 2013, title "A hand-held collapsible tool used to increase the amount of combustible gases available to a fire," inventor Austin Tate Baker.

BACKGROUND OF THE INVENTION

This application relates to starting or maintaining a fire with carbon-based fuels, more particularly with damp, wet, or dry firewood. Previous art includes fixed-length mouth bellows consisting chiefly of a single tube a user blows through onto a fire in order to accelerate combustion by making more oxygen available to the fire. Fixed length limits a user's ability to store and transport the bellows or adjust its length in order to remain a preferred distance from the fire. Previous art also includes a single tube or a telescopic arrangement of tubes with an optional hose attached; a user blows into the hose while aiming the tube at ignited fuels.

INVENTION SUMMARY

It is an object of the present invention to provide extensible bellows which is rugged, durable, compact when stored, and useful to precisely aim a narrow stream of air at fuels when starting or maintaining a fire.

In accordance with these objects and with others which will be described and which will become apparent, an exemplary embodiment of the extensible bellows for delivering a fluid stream of air in accordance with the present invention comprises a plurality of tubes successively nested, each having a nose and a butt, a first one of the plurality of tubes being the outermost and a last one thereof being the innermost. Successive tubes are relatively longitudinally movable over a range from an extended configuration to a retracted configuration. The extended configuration exposes a major length of the inner of the successive tubes outside the nose of the outer one of the tubes. The retracted configuration contains a major length of the inner tube within the outer tube and, with reference to the innermost of the tubes, exposes a minor length of that tube. In a preferred embodiment, this minor length of the innermost of tube is long enough that a user can grasp it manually, usually between thumb and forefinger, and pull it out. As the innermost tube is pulled out, it draws the other tubes out, extending the bellows.

In an exemplary embodiment, the butt of the outer of successive tubes is operatively coupled with the butt of the inner of those successive tubes, limiting the range of relative motion of those tubes when they are in the retracted configuration. An exemplary embodiment has a shim operatively coupled with successive tubes of the plurality of tubes, the shim providing resistance to relative movement of the successive tubes over at least a portion of the range.

In an exemplary embodiment, the butt of the outermost tube is inwardly constricted establishing mechanical interference with the butt of the tube that is nested within that outermost tube, limiting the range of relative motion of those tubes when they are in the retracted configuration.

In an exemplary embodiment, the nose of the outer of successive tubes is operatively coupled with the butt of the inner of those tubes, limiting the range of relative motion of the tubes when they are in the extended configuration.

An exemplary embodiment has a shim operatively coupled with successive tubes, the shim providing resistance to relative movement of the successive tubes over at least a portion of the range of motion between the extended and contracted configurations.

In an exemplary embodiment, the shim, being confined between an inner one and an outer one of successive tubes (i.e., successively nested tubes) is elastically deformed in contact with those tubes.

In an exemplary embodiment, the nose of the outer of successive tubes of the plurality of tubes is inwardly constricted and the shim establishes mechanical interference between the inwardly constricted nose and the butt of the inner of the successive tubes, limiting the range of relative motion of those tubes when they are in the extended configuration.

In an exemplary embodiment, the shim is longitudinally fixed relative to the inner of the successive tubes.

In an exemplary embodiment, the inner tube of the successive tubes has a receiving feature, the shim has an engaging feature, which may be provided in the form of a post, and the receiving feature is operatively coupled with the inner of the successive tubes at the receiving feature, fixing the shim longitudinally relative to the inner of the tubes.

In an exemplary embodiment, the shim establishes mechanical interference between the inner of the successive tubes and the tube next nested in the inner tube, limiting the range in the retracted configuration as to the inner tube and the tube next nested therein.

In an exemplary embodiment, the shim or a portion thereof projects inwardly within the inner tube, establishing mechanical interference between the butt of the inner tube and the butt of the tube next nested therein in the retracted configuration.

An exemplary embodiment has a shim operatively coupled with successive tubes of the plurality of tubes, the shim providing resistance to relative motion of those successive tubes over at least a portion of the range between the extended configuration and the retracted configuration. In one such exemplary embodiment, the shim is elastically deformed in contact with the successive tubes.

In an exemplary embodiment, the nose of the outer of successive tubes of the plurality of tubes is inwardly constricted and the shim establishes mechanical interference between the inwardly constricted nose and the butt of the inner of the successive tubes, limiting the range of relative motion of those tubes in the extended configuration.

In an exemplary embodiment, the shim is longitudinally fixed relative to the inner of the successive tubes.

In an exemplary embodiment, the inner tube of the successive tubes has a receiving feature, which may be an opening in the inner tube, the shim has an engaging feature, which may be a post formed in the shim, and the engaging feature is operatively coupled with the inner tube at the receiving feature, fixing the shim longitudinally relative to the inner tube.

In an exemplary embodiment, the shim or a portion of it establishes mechanical interference between the inner of the successive tubes and the tube next nested in the inner tube, or with at least one tube located within the inner tube, limiting the range of motion of the inner tube relative to the tube next nested therein or relative to at least one tube located therein, when the tubes are in the retracted configuration.

In an exemplary embodiment, the shim projects inwardly within the inner tube, establishing mechanical interference between the butt of the inner tube and the butt of the tube next nested therein when the tubes are in the retracted configuration.

DESCRIPTION

The extensible bellows in accordance with the present invention provides a collapsible mouth bellows. Bellows, generally, accelerate combustion by feeding air to the fire. Air contains oxygen, which supports combustion. Bellows commonly include a bag that emits a stream of air when squeezed. A mouth bellows substitutes air exhaled from a user's mouth as the source of pressurized air. The user of a mouth bellows inhales, then expels air onto a fire through an air duct that is held to the mouth.

The inventor wished to improve ease of transport and storage of mouth bellows. The inventor found that the extensible bellows in accordance with the present invention accomplished these objects, as well as that of allowing easy adjustment of the distance between the user and the fire, by being collapsible/extendable.

The extensible bellows in accordance with the present invention provides a hand-held collapsible tool used to focus a user's exhaled air onto a fire for the purposes of starting and/or maintaining a fire by increasing the amount of air available to the fire, thereby accelerating combustion, increasing the rate of production of heat, and increasing the rate of warming and drying of adjacent and nearby fuels. The bellows is open-ended, the distal (fire-oriented) opening in the preferred embodiment being somewhat smaller than the proximal (mouth contacting) opening. Advantages include ease of transport and storage and ease of adjusting the distance between the user and a fire, and are derived largely from the bellows' extensible-collapsible arrangement.

A preferred embodiment of the extensible bellows in accordance with the present invention has four elongate hollow members—tubes—that in one embodiment are cylindrical in overall shape but could, in alternative embodiments, have different shape, such as ellipsoidal or polygonal. The dimensions of the tubes are chosen to be conducive to making the tool hand-held. Other embodiments may include as few as two tubes or as many as a user desires. The number of elongate hollow members and the length of the elongate hollow members is determined by the desired length of the tool in its extended position and the desired length of the tool in its collapsed position. In an exemplary embodiment, the tubes are of approximately equal length. Preferably, the innermost tube is slightly longer or its range of motion is reduced somewhat so that, when it is in the retracted configuration, about 1-2 cm of the innermost tube protrudes from the nose of the tube the innermost tube is nested in. This length is easily grasped when a user desires to extend the bellows.

To permit telescoping, the tubes are of slightly different diameter as to allow each to slide within the tube it is nested in. When a user exhales through the bellows, air exhaled into the bellows accelerates as it enters successively narrower tubes, and is emitted from the simple, neatly formed nose of the innermost tube in a narrow, rapidly moving stream. This focused stream of air is well suited to selectively accelerating the core of a fire.

The nose of each tube that has another tube nested in it is inwardly constricted towards the tube nested therein. This reduction, tapering, or flange, as it may be termed, facilitates interlocking the tubes to form the bellows and also prevents frontward separation of any tube from the tube it is nested in. The butt of the outermost tube is also inwardly constricted, to prevent the tube that is nested in the outermost tube from backing out of the outermost tube.

Shims are disposed between successively nested tubes. In a preferred embodiment, two shims are used and they serve multiple purposes. First, because the shims are confined between successively nested tubes and are shaped to gently resist being so confined, they establish frictional resistance to relative movement of those successively nested tubes. The inventor found that beryllium copper alloy shims worked well with Grade 201 austenitic stainless steel, endowing the extensible bellows with the long-lasting, smooth frictional resistance that a user will appreciate in a fine tool.

Second, the shims resist confinement sufficiently that they directionally stabilize each tube relative to the tube it is nested in. This is important, because the directional stability—in other words, the tight alignment—of the entire series of nested tubes gives the extensible bellows in accordance with the present invention exceptional stiffness and precision and make holding and operating it a satisfying experience for the user.

Third, because the shims add to the effective diameter of the inner of the successively nested tubes and are operatively coupled to those inner tubes in a way that fixes the shims longitudinally relative to the tubes, the shims mechanically interfere with the inwardly constricted noses of the outer of the successively nested tubes. This mechanical interference stops the inner tube from escaping the nose of the outer tube. In a preferred embodiment, each shim has an inwardly projecting post, each inner tube has an opening a few millimeters from the butt of that tube, and the post projects inwardly through the opening, fixing the shim relative to the tube. Some embodiments employ a plurality of openings, a plurality of shims, and a plurality of posts. This cooperation, in turn, establishes the operative coupling between the nose of the outer tube and the butt of the inner tube when the extended configuration is approached.

Fourth, each post projects inward far enough that, when yet another, smaller tube successively nested in the inner of the aforementioned tubes is pushed in toward the retracted configuration, the butt of that smaller tube mechanically interferes with the inwardly projecting post, preventing that smaller tube from backing out of the butt of the inner tube.

As a result of these aspects of structure and cooperation, the extensible bellows in accordance with the present invention not only extends and retracts smoothly and reliably and can be aimed precisely, but also requires no special care in preventing separation of tubes in either the retracted or the extended configuration; requires no special care in grasping and pulling the innermost tube out from the retracted configuration, and need not be equipped with any out-turned nose structure or other attachment in order to facilitate such grasping or interlocking. It will be appreciated that such extra structures add cost and complexity, reduce reliability and durability, and may create inconvenience by occupying space, snagging on other objects, breaking, or separating and being lost. Also advantageously, the posts of the shims project inwardly only as far as needed; occupying minimal volume, they cause minimal interference with air flow.

Each shim is flared outward from the elongate hollow member that it is mounted around, enough to cause nominal contact pressure between the shim and the tubes it is confined between. Thus, the tubes slide within each other while providing stability between the elongate hollow members, as well as preventing frontward escape and separation in the extended configuration.

BRIEF DESCRIPTION OF THE DRAWING FIGURES

For a further understanding of the objects and advantages of the present invention, reference should be had to the following detailed description, taken in conjunction with the accompanying drawing, in which like parts are given like reference numbers and wherein.

DETAILED DESCRIPTION WITH REFERENCE TO THE DRAWING FIGURES

The invention is now described with reference to the drawing figures.

Figure 1:
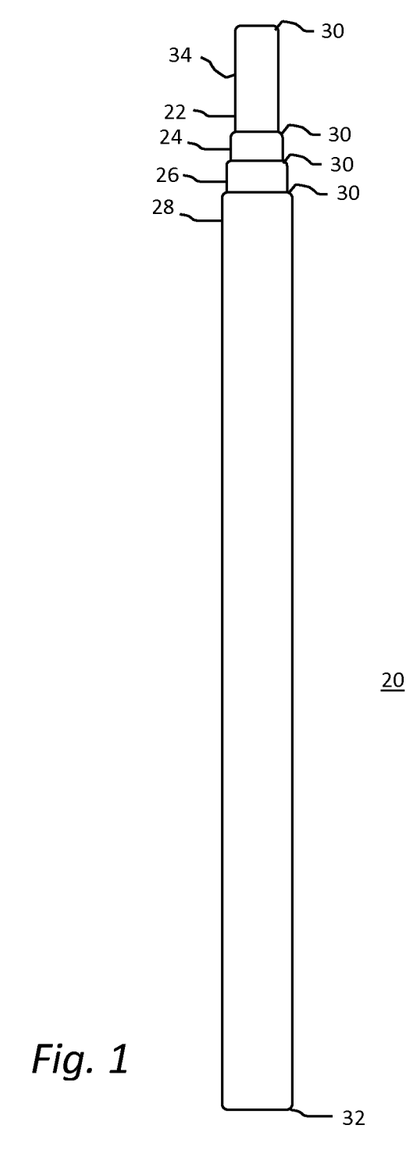
FIG. 1 is a side elevational view of an exemplary embodiment of extensible bellows in accordance with the present invention in a retracted configuration.

FIG. 1, a side elevational view of an exemplary embodiment of the extensible bellows 20 in accordance with the present invention, shows a plurality of tubes 22, 24, 26, and 28, each having a nose 30 and a butt 32 (only the butt 32 of the outermost tube 28 being visible in this view). Successive tubes in this plurality of tubes are relatively longitudinally movable over a range between a retracted configuration, shown in FIG. 1, and an extended configuration, to be shown in a subsequent figure. In the retracted configuration, a major length of each tube, except the outermost tube 28, is contained within another of the tubes; however, the innermost tube 22 has a minor length 34 exposed and this minor length 34 is sufficient to enable a user to grasp the innermost tube 22 manually for the purpose of pulling it out to extend the tubes.

With continued reference to FIG. 1, the butt 32 of each tube is operatively coupled with the butt 32 of the tube it is nested in, limiting the range of relative motion of the tubes, so that, ultimately, none of the tubes can project rearward from the outermost tube 28. In a preferred embodiment of the extensible bellows in accordance with the present invention, the butt 32 of the outermost tube 28 is inwardly constricted to an internal diameter small enough that, as tube 26, which is nested in outermost tube 28, is moved to the retracted configuration, the butt 32 of tube 26 mechanically interferes with the inwardly constricted butt 32 of outermost tube 28, limiting the range of relative motion of tubes 26 and 28 in the retracted configuration.

Figure 2:
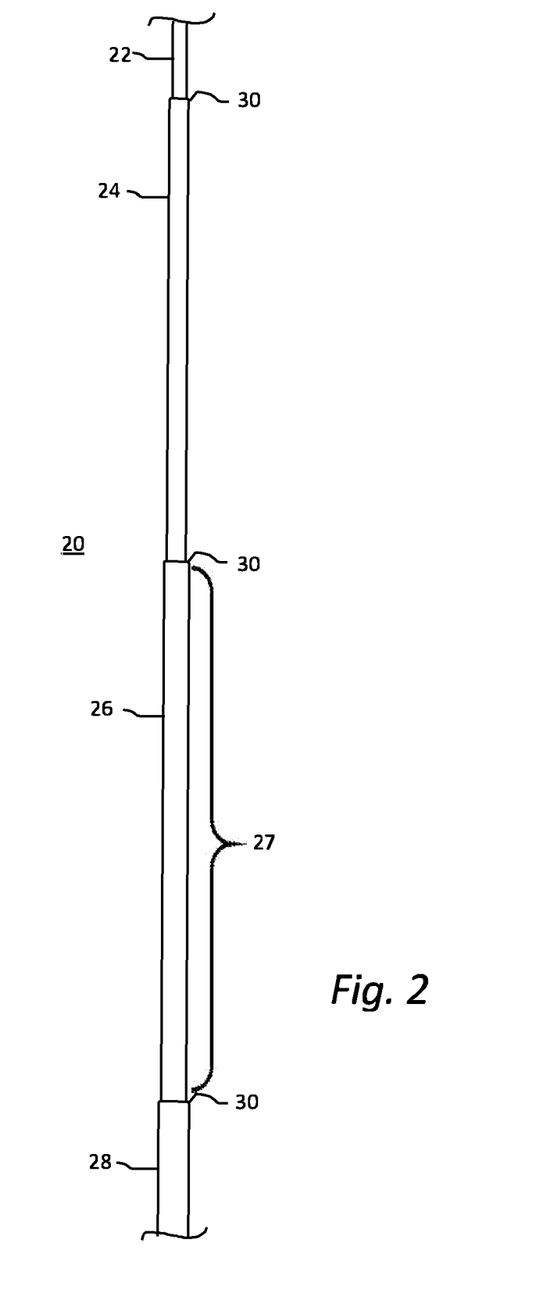
FIG. 2 is a side elevational view thereof in an extended configuration.

FIG. 2, a partial side elevational view of the exemplary embodiment of the extensible bellows of FIG. 1 in an extended configuration, shows the tubes 22, 24, 26 and 28 and noses 30. The innermost tube 22 and intervening tubes 24 and 26 are all shown in the extended configuration relative to the tubes they are nested in, tube 26, for example, being extended relative to the outermost tube 28, exposing a major length 27 of tube 26. In FIG. 2, the end portions of tubes 22 and 28 are omitted to enable the drawing to fit the page.

With continued reference to FIG. 2, in a preferred embodiment of the extensible bellows, the nose 30 of the outer of any two successive tubes is operatively coupled with the butt 32 of the inner of those tubes, limiting the successive tubes' relative range of motion in the extended configuration, which prevents the inner of the tubes from separating from the outer and being lost. Also in a preferred embodiment, the nose 30 of the outer of successive tubes is inwardly constricted to facilitate operative coupling with the butt 32 of the inner of those tubes.

Figure 3:
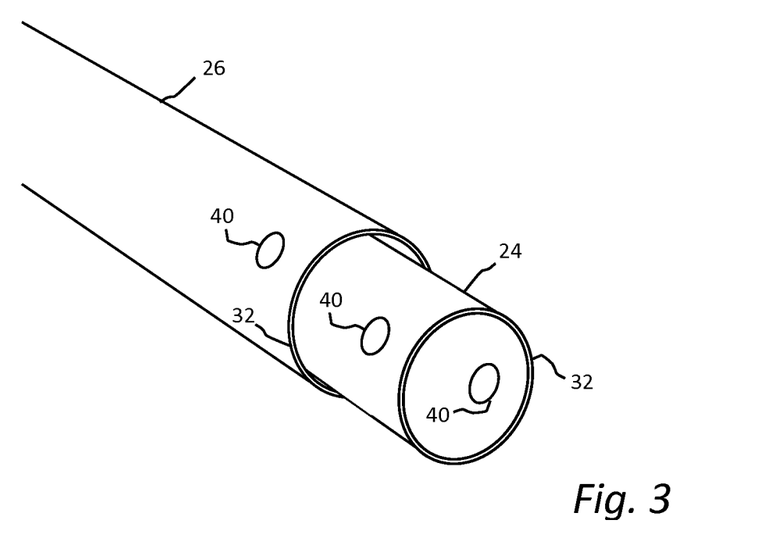
FIG. 3 is a partial perspective view thereof, partially assembled, showing tubes and shims.

FIG. 3, a partial perspective view of an exemplary embodiment of the extensible bellows in accordance with the present invention, shows the bellows in a partially assembled condition with tube 24 nested within tube 26. The butt 32 of tube 24 is backed out of the butt 32 of tube 26. Tube 24 and tube 26 each have a receiving feature, soon to be discussed in greater detail, near butt 32. Also provided is at least one shim 42 having a post 44 which projects inwardly relative to the curvature of the shim 42.

Figure 4:
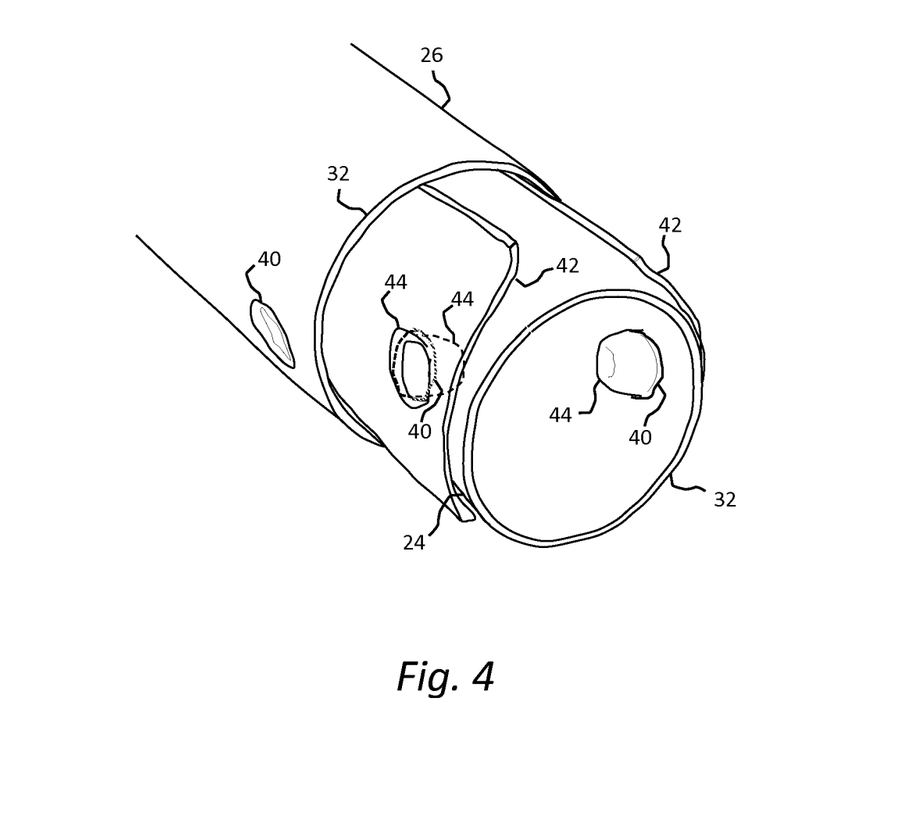
FIG. 4 is a partial perspective view thereof, partially assembled, showing shims confined between tubes.

FIG. 4, a partial perspective view of an exemplary embodiment of the bellows in accordance with the present invention, shows a portion of the bellows in a more assembled condition. Tube 24 is shown nested within tube 26, the butt 32 of tube 24 being backed out of the butt 32 of tube 26 to show a pair of shims 42 disposed about tube 24 and inside tube 26. With continued reference to FIG. 3 and now also to FIG. 4, when the bellows is assembled, the shim 42 engages the receiving feature of the inner tube 24, fixing the shim 42 longitudinally relative to the inner tube 24. Also in accordance with a preferred embodiment, the shim 42 cooperates with the inwardly constricted nose (not shown in this drawing figure) of the outer tube 26 to limit the range of relative motion of the inner tube (tube 24) relative to the outer tube (tube 26) in the extended configuration.

With continued reference to FIG. 3 and FIG. 4, in a preferred embodiment, two receiving features are located diametrically opposite one another and each receiving feature is provided as an opening 40 having a diameter of 2-4 millimeters formed in each of tubes 24 and 26 a few millimeters from the butt 32. Also in a preferred embodiment, a shim 42 having a receiving feature in the form of a post 44 is provided for each opening 40. In FIG. 4, two posts 44 are illustrated: one, visible to the right, projects inward and leftward in the field of view through an opening 40; the other, visible to the left, projects inward and rightward in the field of view and is drawn partly in solid line and partly in dotted line (where no direct line of sight is depicted), since it projects inward through an opening 40 to which no direct line of sight is depicted. When assembled, the shim 42 is disposed around inner tube 24 with the post 44 engaged in the opening 40.

With continued reference to FIG. 3 and FIG. 4, after inner tube 24 is fully inserted into outer tube 26, the shim 42 is disposed between the inner tube 24 and the outer tube 26. Preferably, the shim 42 is shaped such that, when confined between inner tube 24 and outer tube 26, it provides frictional resistance to longitudinal movement of inner tube 24 relative to outer tube 26. For example, the shim 42 is formed with a radius of curvature greater than that of outer tube 26 or lesser than that of inner tube 24, or is otherwise warped or flared, so that, when confined between the tubes 24 and 26, it exerts pressure against them, resulting in frictional resistance to movement.

Figure 5:
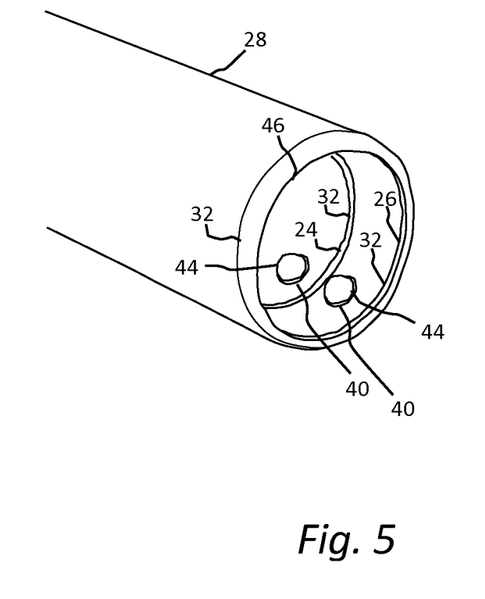
FIG. 5 is a partial perspective view thereof, assembled, in a retracted configuration.

FIG. 5, a partial perspective view of an exemplary embodiment of the bellows in accordance with the present invention, shows the bellows assembled and in the retracted configuration. The butt 32 of the outermost tube 28 is inwardly constricted, such that the lip 46 of the butt 32 of tube 28 has an internal diameter lesser than the internal diameter of tube 26. Thus, the rearward travel of tube 26 is limited in the retracted configuration and tube 26 will not escape rearwardly from tube 28.

With continued reference to FIG. 5, when tube 24 is in the retracted configuration relative to tube 26, the butt 32 of tube 24 mechanically interferes with the post 44 of the shim 42. It will be noted that while the shim 42 is mostly confined between tube 26 and outermost tube 28, the post 44 of that shim projects inwardly within tube 26. As a result, tube 24, which is confined within tube 26, is prevented from escaping rearwardly from tube 26. A like relationship exists between the butt 32 of innermost tube 22 and the post 44 of the shim 42 that is mostly confined between tube 24 and tube 26, with like effect.

Figure 6:
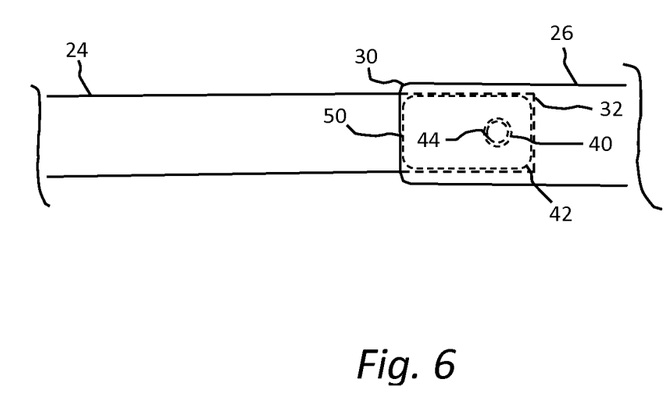
FIG. 6 is a partial side sectional view thereof, assembled, in an extended configuration.

FIG. 6, a partial side sectional view of an exemplary embodiment of bellows in accordance with the present invention, shows part of tube 24 confined in part of tube 26 in the extended configuration. Dotted lines illustrate the relative position and orientation of the receiving feature of tube 24, namely opening 40, and the engaging feature of the shim 42, namely, the post 44, relative to the butt 32 of tube 24 and the nose 30 of tube 26. Shim 42 is confined between tube 26 and tube 24. Thus, post 44 engages opening 40, fixing shim 42 longitudinally relative to tube 24. As tube 24 is moved toward the extended configuration, the front edge 50 of shim 42 mechanically interferes with the inwardly constricted nose 30 of tube 26, limiting the range of motion of tube 24 relative to tube 26 in the extended configuration and preventing tube 24 from separating from tube 26. Like relationships exist wherever a shim is disposed between tubes, and with like effect.

Figure 7:
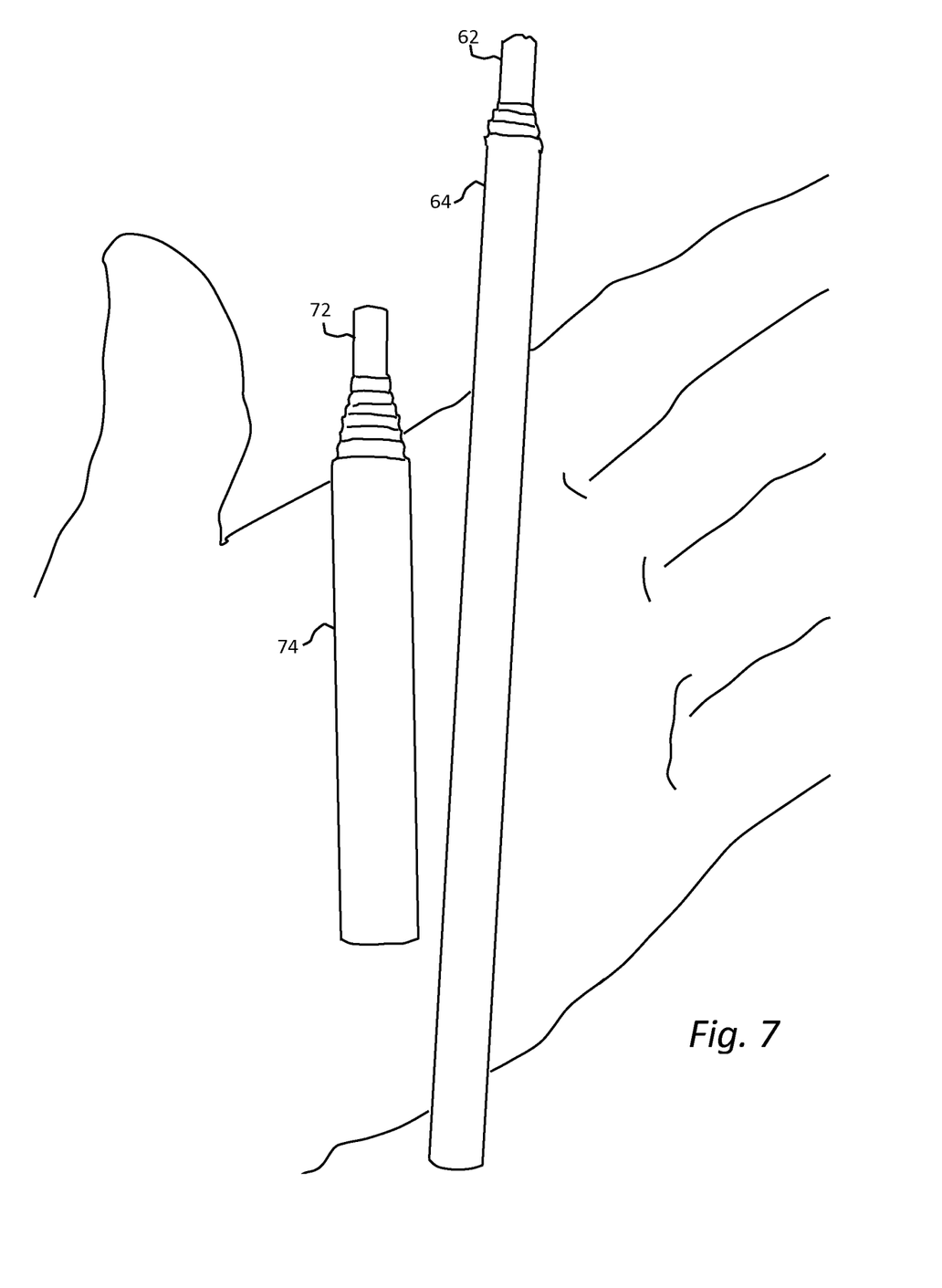
FIG. 7 is a perspective view of two exemplary embodiments of extensible bellows in accordance with the present invention differing in the number of tubes and in the lengths of the tubes.

FIG. 7, a perspective view from the side of two exemplary embodiments of extensible bellows in accordance with the present invention differing in the number of tubes and in the lengths of the tubes as they might be held in the palm of a person's hand, demonstrates that the present invention encompasses a variety of embodiments of the bellows. To the right in the field of view innermost tube 62 and outermost tube 64 are arranged as set forth herein along with approximately three intervening tubes (not numbered). To the left in the field of view innermost tube 72 and outermost tube 74 are arranged as set forth herein along with approximately six intervening tubes (not numbered). Thus, in accordance with the present invention, extensible bellows may be produced in accordance with a user's preference for a narrower bellows, or a shorter one, in the retracted (collapsed) configuration.

Dimensions and Materials:

The tubes 22, 24, 26, and 28 in an exemplary embodiment of the bellows are made of Grade 201 austenitic stainless steel, which is corrosion resistant, provides sufficient plasticity to allow the fabrication of the tube reductions or flanges without causing fracture, and has sufficient hardness to handle the forces applied when extending and retracting the bellows and stand up to the rigors of use. The inventor found Grade 201 steel to be an economically viable material for this application. However, other suitable metallic and non-metallic materials may be employed. Portions held close to a flame should be formed of heat resistant material.

The tubes have the following dimensions:

Tube 22: length 158 mm, outside diameter 5 mm, thickness 0.15 mm, nose constriction 0.95 mm reduction, butt restriction (N/A);

Tube 24: length 151 mm, outside diameter 6 mm, thickness 0.15 mm, nose constriction 0.95 mm reduction, butt restriction (N/A);

Tube 26: length 151 mm, outside diameter 7 mm, thickness 0.15 mm, nose constriction 0.95 mm reduction, butt restriction (N/A);

Tube 28: length 151 mm, outside diameter 8 mm, thickness 0.18 mm, nose constriction 0.95 mm reduction, butt restriction 0.95 mm.

The shims 42 in an exemplary embodiment of the bellows are formed of a beryllium copper alloy, which is corrosion resistant, provides sufficient low-temperature creep strength to keep the shim from deforming over time under the constant stresses applied by its confinement between the tubes, and exhibits a low enough hardness to allow the posts to be formed in the shim by pressing. The inventor found beryllium copper alloy to be an economically viable material for this application. However, other suitable materials may be employed, such as other metallic and non-metallic materials. Shims held close to a flame should be formed of heat resistant material.

The shims have the following dimensions:

Shims around tube 22 length 12 mm, width/arc 5.5 mm, radius of curvature 2.55 mm, material thickness 0.13 mm, post height 1 mm, post other dimensions, 1 mm wide;

Shims around tube 24 length 12 mm, width/arc 6.5 mm, radius of curvature 3.05 mm, material thickness 0.13 mm, post height 1 mm, post other dimensions, 1 mm wide;

Shims around tube 26 length 12 mm, width/arc 7.5 mm, radius of curvature 3.55 mm, material thickness 0.13 mm, post height 1 mm, post other dimensions, 1 mm wide;

There are no shims around tube 28 if it is the outermost tube.

Sourcing and Fabrication:

Cutting the tubes is accomplished by orbital cutting.

Inward constriction of noses and butts is accomplished by tube end forming (domed).

Forming the openings in the tubes is accomplished with a drill press.

Forming the shims is accomplished by pressure stamping.

Forming the posts in the shims is accomplished pressure stamping.

Assembly:

The four different diameter tubes are provided, all having inwardly constricted noses 30 and plain butts 32. Shims of appropriate size are mounted on each tube, with the post of each shim engaged in the opening of the tube it is mounted on. Tubes that are to be successively nested are approximated, the nose 30 of each tube entering the butt 32 of the tube it is to be nested in. The tubes are moved relatively toward the extended configuration. When this procedure is finished, tubes 22, 24, and 26 are successively nested in tube 28. As a final step, the butt 32 of tube 28 is inwardly constricted by means of a process known as reduction or tapering, thereby permanently closing the rearward escape route of tube 26.

Use: The user stores and transports the present invention in the retracted configuration. When the user perceives a need to accelerate a fire, the user extends the bellows by manually pulling the opposite ends of the invention away from each other, causing the tubes to slide smoothly toward the extended configuration. The user stops pulling when the bellows is long enough to provide a desired distance between the user and the fire. The user then places his/her mouth on the butt 32 of tube 28, aims the nose 30 of tube 22 as desired, and exhales. The exhaled air exits the nose 30 of tube 22 and travels toward the fire, supplying oxygen to the fire. When finished, the user collapses the bellows to the retracted configuration for storage and transport. Both the nose 30 of tube 22 and the butt 32 of tube 28 being neatly formed and inwardly constricted, the bellows has no sharp edges or laterally protruding structures to impinge on other items or become entrained in clothing.

The bellows in accordance with the present invention can also be used to remove solid particles from an area by blowing though it toward the area. Should the need arise, it is also usable as a drinking straw.

As can be seen from the drawing figures and from the description, each embodiment of the extensible bellows in accordance with the present invention solves a problem by addressing the need for a compact, rugged, durable, smoothly extensible mouth bellows which can be aimed with precision.

While the specification describes particular embodiments of the present invention, those of ordinary skill can devise variations of the present invention without departing from the inventive concept.

Although specific embodiments have been illustrated and described herein, those of ordinary skill in the art will appreciate that any arrangement calculated to achieve same purposes can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

In the foregoing description, if various features are grouped together in a single embodiment for the purpose of streamlining the disclosure, this method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims, and such other claims as may later be added, are hereby incorporated into the description of the embodiments of the invention, with each claim standing on its own as a separate preferred embodiment.

What is claimed is:

1. A method for stoking a fire, said method comprising the steps of:
    providing an extensible bellows, the extensible bellows comprising:
        a plurality of successively nested hollow tubes, each tube having a nose and a butt;
        a first one of the plurality of successively nested hollow tubes being the outermost tube, and a last one of the plurality of successively nested hollow tubes being the innermost tube;
        the plurality of successively nested hollow tubes being relatively longitudinally movable over a movable range from an extended configuration to a retracted configuration;
    wherein the extended configuration of the plurality of successively nested hollow tubes exposing a major length of the inner of two successively nested hollow tubes outside the nose of the outer of the two successively nested hollow tubes; and
    the retracted configuration of the plurality of successively nested hollow tubes containing a major length of the inner tube within the outer tube and, with reference to said innermost of said plurality of tubes, said retracted configuration exposing a minor length thereof;
    the plurality of successively nested hollow tubes comprising a pair of adjacent successively nested tubes, the pair of adjacent successively nested tubes comprising:
        an inner of the pair of adjacent successively nested tubes and an outer of the pair of adjacent successively nested tubes, the inner of the pair of adjacent successively nested tubes having a diameter less than the diameter of the outer of the pair of adjacent successively nested tubes;
        the butt of the outer of the pair of adjacent successively nested tubes being operatively coupled with the butt of the inner of the pair of adjacent successively nested tubes, limiting the movable range in the retracted configuration; and
        the nose of the outer of the pair of adjacent successively nested tubes being inwardly tapered;
        a pair of shims operatively coupled with the inner of the pair of adjacent successively nested tubes;
    the pair of shims comprising:
        a post projecting from the inner surface of each shim, each post establishing mechanical interface with the inner of the pair of adjacent successively nested tubes through a hole in each of the inner of the pair of adjacent successively nested tubes;
        wherein the pair of shims, excluding a poriton of the posts, is disposed in the space between the pair of adjacent successively nested tubes with an inner surface of the pair of shins abutting the inner of the pair of adjacent successively nested tubes and an outer surface of the pair of shims abutting the outer of the pair of adjacent successively nested tubes; and
    extending the extensible bellows from the retracted configuration to the extended configuration by imparting a longitudinal force to the extensible bellows; and
    stoking the fire by imparting a supply of oxygen to the fire through the extended extensible bellows.

2. The method of claim 1, wherein the portion of the pair of shims disposed in the space between the pair of adjacent successively nested tubes have a radius of curvature greater than the inner of the pair of adjacent successively nested tubes and a radius of curvature less than the outer of the pair of adjacent successively nested tubes.

3. The method of claim 1, wherein the pair of shims are elastically deformable and are confined under tension between the inner of the pair of adjacent successively nested tubes and the outer of the pair of adjacent successively nested tubes.

4. The method of claim 1 further comprising the step of returning the extensible bellows to the retracted configuration after completing the step of stoking the fire by imparting a longitudinal force to the extensible bellows.

5. The method of claim 4, wherein the step of returning the extensible bellows to the retracted configuration is completed without imparting a force perpendicular to the imparted longitudinal force.

6. The method of claim 1 wherein said step of stoking comprises supplying oxygen through the extensible bellows into the butt of the outermost tube and out of the nose of the innermost tube.

7. An extensible bellows, comprising:
a plurality of successively nested hollow tubes, each tube having a nose and a butt;
a first one of the plurality of successively nested hollow tubes being the outermost tube and a last one of the plurality of successively nested hollow tubes being the innermost tube;
the plurality of successively nested hollow tubes being relatively longitudinally movable over a movable range from an extended configuration to a retracted configuration;
wherein the extended configuration of the plurality of successively nested hollow tubes exposing a major length of the inner of two successively nested hollow tubes outside the nose of the outer of the two successively nested hollow tubes; and
the retracted configuration of the plurality of successively nested hollow tubes containing a major length of the inner tube within the outer tube and, with reference to said innermost of said plurality of tubes, said retracted configuration exposing a minor length thereof;
the plurality of successively nested hollow tubes comprising a pair of adjacent successively nested tubes,
the pair of adjacent successively nested tubes comprising:
an inner of the pair of adjacent successively nested tubes and an outer of the pair of adjacent successively nested tubes, the inner of the pair of adjacent successively nested tubes having a diameter less than the diameter of the outer of the pair of adjacent successively nested tubes;
the butt of the outer of the pair of adjacent successively nested tubes being operatively coupled with the butt of the inner of the pair of adjacent successively nested tubes, limiting the movable range in the retracted configuration; and
the nose of the outer of the pair of adjacent successively nested tubes being inwardly tapered;
a pair of shims operatively coupled with the inner of the pair of adjacent successively nested tubes, the pair of shims comprising:
a post projecting from the inner surface of each shim, each post establishing mechanical interface with the inner of the pair of adjacent successively nested tubes through a hole in each of the inner of the pair of adjacent successively nested tubes;
wherein the pair of shims, excluding a poriton of the posts, is disposed in the space between the pair of adjacent successively nested tubes with an inner surface of the pair of shins abutting the inner of the pair of adjacent successively nested tubes and an outer surface of the pair of shims abutting the outer of the pair of adjacent successively nested tubes; and
wherein the pair of shims limit the range of longitudinal movement of the inner of the pair of adjacent successively nested tubes relative to the outer of the pair of adjacent successively nested tubes.

8. The extensible bellows of claim 7, wherein the portion of the pair of shims disposed in the space between the pair of adjacent successively nested tubes have a radius of curvature greater than the inner of the pair of adjacent successively nested tubes and a radius of curvature less than the outer of the pair of adjacent successively nested tubes.

9. The extensible bellows of claim 7, wherein the pair of shims are elastically deformable and are confined under tension between the inner of the pair of adjacent successively nested tubes and the outer of the pair of adjacent successively nested tubes.

10. The extensible bellows of claim 7, wherein the butt of the outer of the pair of adjacent successively nested tubes has an inwardly-constricted lip.

11. The extensible bellows of claim 7, wherein the butt of the outer of the pair of adjacent successively nested tubes has a tapered lip.

12. The extensible bellows of claim 7, wherein the tapered nose of the outer of the pair of adjacent successively nested tubes is annular and extends around the entire circumference of the nose of the outer of the pair of adjacent successively nested tubes.

13. The extensible bellows of claim 12, wherein the cross section of the outer of the pair of adjacent successively nested tubes is annular throughout the length of the outer of the pair of adjacent successively nested tubes between the nose of the outer of the pair of adjacent successively nested tubes and the butt of the outer of the pair of adjacent successively nested tubes.

* * * * *